US012311856B2

(12) United States Patent
Mueller et al.

(10) Patent No.: US 12,311,856 B2
(45) Date of Patent: May 27, 2025

(54) CONNECTING ELEMENT FOR IMPROVED CRASH BEHAVIOUR IN A CAR TO CAR COLLISION

(71) Applicant: CONSTELLIUM SINGEN GMBH, Singen (DE)

(72) Inventors: Andre Mueller, Hilzingen (DE); Thomas Rebstock, Hilzingen (DE)

(73) Assignee: CONSTELLIUM SINGEN GmbH, Singen (DE)

( * ) Notice: Subject to any disclaimer, the term of this patent is extended or adjusted under 35 U.S.C. 154(b) by 203 days.

(21) Appl. No.: 17/791,984

(22) PCT Filed: Jan. 22, 2021

(86) PCT No.: PCT/EP2021/051423
§ 371 (c)(1),
(2) Date: Jul. 11, 2022

(87) PCT Pub. No.: WO2021/151787
PCT Pub. Date: Aug. 5, 2021

(65) Prior Publication Data
US 2023/0047814 A1    Feb. 16, 2023

(30) Foreign Application Priority Data
Jan. 31, 2020  (EP) .................... 20154846

(51) Int. Cl.
*B60R 19/12*    (2006.01)
*B60R 19/18*    (2006.01)
*B60R 19/34*    (2006.01)

(52) U.S. Cl.
CPC .............. *B60R 19/12* (2013.01); *B60R 19/18* (2013.01); *B60R 19/34* (2013.01)

(58) Field of Classification Search
CPC ......... B60R 19/04; B60R 19/12; B60R 19/26; B60R 19/34
(Continued)

(56) References Cited

U.S. PATENT DOCUMENTS 8,474,583 B2 * 7/2013 Nagwanshi ............. B60R 19/34
                                                188/371
9,457,746 B1    10/2016 Baccouche et al.
(Continued)

FOREIGN PATENT DOCUMENTS

DE    102005018348 A1    11/2005
DE    202006020846 U1 *  8/2010 ............. B60R 19/12
(Continued)

OTHER PUBLICATIONS

DE202006020846 Text (Year: 2010).*
(Continued)

*Primary Examiner* — Dennis H Pedder
(74) *Attorney, Agent, or Firm* — Ladas & Parry LLP; Malcolm J. MacDonald, Esq.

(57) ABSTRACT

A crash management system (1, 1', 1") for a front part of a vehicle, oriented in a local referential, having a longitudinal direction X a transverse direction Y perpendicular to the longitudinal direction X and a vertical direction Z perpendicular to the plane defined by said directions X and Y, comprising an assembly (2, 2', 2") of bumper beams with at least a first bumper beam (3, 3', 3") and a second bumper beam (4, 4', 4"), oriented in said transverse direction Y, said first bumper beam (3, 3', 3") and second bumper beam (4, 4', 4") being vertically spaced wherein said first bumper beam (3, 3', 3") is located above said second bumper beam (4, 4', 4"), optionally comprising at least one crash box (5, 6) connected to at least a bumper beam (3, 3', 3", 4, 4', 4"), and comprising at least a connecting element (100, 200, 300, 400,
(Continued)

500) characterized in that said connecting element (100, 200, 300, 400, 500) connects said first bumper beam (3, 3', 3") and said second bumper beam (4, 4', 4"), and wherein said connecting element (100, 200, 300, 400, 500) is an extruded hollow profile which extrusion direction (E) is substantially parallel to said vertical direction Z.

16 Claims, 6 Drawing Sheets

(58) Field of Classification Search
USPC .............. 293/134, 148, 146, 149, 151, 152
See application file for complete search history.

(56) References Cited

U.S. PATENT DOCUMENTS

| | | |
|---|---|---|
| 9,550,462 B2 | 1/2017 | Ramoutar et al. |
| 10,086,785 B2 | 10/2018 | Wu et al. |
| 11,077,813 B2 * | 8/2021 | Coppuck ................ B60R 19/34 |

FOREIGN PATENT DOCUMENTS

| | | | |
|---|---|---|---|
| DE | 102017124590 A1 | 4/2019 | |
| EP | 0 798 197 A1 | 10/1997 | |
| EP | 1 293 389 A1 | 3/2003 | |
| EP | 2 540 575 A2 | 1/2013 | |
| JP | H08197178 A * | 8/1996 | |
| JP | 2008213739 A | 9/2008 | |
| WO | 2007/011238 A1 | 1/2007 | |
| WO | WO-2014161659 A1 * | 10/2014 | ............ B21D 28/00 |
| WO | 2016/026893 A1 | 2/2016 | |

OTHER PUBLICATIONS

Jp8197178 Text (Year: 1996).*
WO2014161659 Text (Year: 2014).*
International Search Report, dated Mar. 1, 2021, corresponding to International Application No. PCT/EP2021/051423.

* cited by examiner

CONNECTING ELEMENT FOR IMPROVED CRASH BEHAVIOUR IN A CAR TO CAR COLLISION

FIELD OF THE INVENTION

The invention relates to a connecting element attached to a first bumper beam and a second bumper beam of a crash management system, that is subjected to control the crash behaviour of the crash management system in case of a car to car collision.

BACKGROUND

The term crash management system is generally used to describe the structural module consisting of the bumper beam and the related attachments which connect the bumper to the longitudinal rails of the vehicle. The main goal of a crash management system is to prevent damages following a choc between a vehicle and an obstacle.

A crash management system has the ability to absorb sufficient crash energy to meet the OEM's internal standard. In other words, the crash management system should be able to absorb energy at the start of a crash and to guide the remaining crash forces into the rest of the body structure.

A crash management system includes a bumper beam typically extending laterally across the front or rear end of a vehicle and provided generally for absorbing energy during a frontal or rear impact. Such bumper beams are mounted to a vehicle frame using crash boxes also called shock absorbers or deformation elements.

To assess the risk to pedestrians from passenger cars in the event of a traffic accident vehicles may have a crash management system comprising two bumper beams, a lower and an upper beam arranged above the lower beam in order to satisfy to the safety requirements for a front impact energy absorption and the regulations protecting pedestrians from lower leg injuries caused by bumper impacts.

In order to insure the safety of passengers, vehicles are subject to a wide variety of tests and evaluations. Such tests are usually mandated by government regulations and insurance certifications. Numerous types of collisions exist, but new tests are constantly being proposed to improve the safety around the vehicle, like the occupant safety, the pedestrian safety and the safety of other vehicle occupants.

Currently, the collision tests are provided using an offset deformable barrier where the vehicle behaviour is evaluated by a collision between a moving vehicle against a fixed barrier. This current fixed offset deformable barrier impact test (also called ODB test) will be replaced by a mobile barrier test with a progressive deforming element in order to reproduce a car to car collision (also called MPDB test for Mobile Progressive Deformable Barrier). One target of the crash management system to answer to this new requirement is to propose a constant barrier deformation without any deep impact. Modifications to the design of the existing crash management system are necessary to enhance the additional upcoming requirements of crash compatibility. The crash compatibility requirement is intended to minimize or mitigate the damage to the other vehicle in the event of crash.

U.S. Pat. No. 10,086,785 B2 discloses a front end structure for a vehicle to enhance vehicle compatibility performance. The front end structure includes a bumper disposed behind a front fascia panel. Crush cans are attached between the bumper and a frame rail. A shield is attached to the bumper that extends above the bumper and below the bumper to spread deformation caused by the crush cans and bumper of a deformable barrier in a collision to areas above and below the bumper.

WO 2016/026893 A1 discloses a supporting element fastened to the end portion of the bumper cross member and extending rearwards in the longitudinal direction of the vehicle over a predetermined length. The supporting element is designed and arranged in such a manner that, in the event of deformation of the end portion of the bumper cross member as a consequence of a frontal collision of the motor vehicle, in particular a frontal collision with little overlap, the supporting element supports the end portion on the longitudinal member arrangement. Here, that is to say by means of the support, further deformation of the end portion in the direction of the longitudinal member arrangement is inhibited. The supporting element is made of a plastic, in particular a fibre-reinforced plastic.

U.S. Pat. No. 9,457,746 B1 discloses a vehicle including a frame, a bumper, and an impact absorber. The impact absorber extends from the frame to the bumper. The impact absorber has a sliding member and a receiving member. The receiving member defines an orifice and a portion of the sliding member is disposed within the orifice. The sliding member is configured to slide into the receiving member during impact events such that the receiving member yields and flares outward to absorb energy.

U.S. Pat. No. 9,550,462 B2 discloses a support structure assembly for an automotive vehicle including a side member extending in a generally longitudinal direction and having a forward end, a link member having a generally fixed shape and having outer and inner mounting portions with the inner portion being mounted to the side member via an inner hinged connection and a bumper having a main bumper member and a bumper extension member forming an end portion of the bumper. The bumper extends generally transverse and lateral to the longitudinal direction of the side member, and the bumper extension member extends laterally across and beyond the forward end of the side member. The bumper extension member includes forward and rearward wall portions. The rearward wall portion is sandwiched between the main bumper member and the forward end of the side member.

SUMMARY OF THE INVENTION

The present invention proposes a solution to extend the crash management system in its length and width, while making it possible, in the event of an impact, to prevent the penetration of a component external to the vehicle towards the interior of the latter in case of a car to car collision.

The present invention relates to a crash management system comprising an upper and a lower, or a first and a second bumper beams able to be deformed into a flat vertical surface in case of car to car collision avoiding intrusion into the interior of the vehicle.

The crash management system is extended by an element connecting the upper and the lower bumper beams in a solid way. The connecting element of this invention is an extruded hollow profile.

DESCRIPTION OF THE INVENTION

The crash management systems are continuously optimized to answer to the requirement imposed by the legislation. A new test to address the crash behaviour of a vehicle and control the performance of the crash management system is implemented to replace the fixed offset deformable barrier impact test (called also ODB test). The Mobile Progressive Deformable Barrier test (MPBD test) test the behaviour of a vehicle in case of impact against a mobile barrier. Target of the MPDB test is to have a vehicle with a constant barrier deformation without any deep impact into the latter.

The problem to be solved by the invention is to improve the performance of the known crash management systems to answer to the MPDB test requirement, avoiding making the system heavier and occupying the smallest possible volume, as the available space is limited and cluttered by all other elements necessary for the proper functioning of the vehicle.

The solution proposed by the invention is a small and flexible concept, which consists in the addition of one or more element to the crash management system. This added element is an extruded hollow profile attached to the crash management system with a solid link.

In the description, the X, Y and Z axis corresponds to a local referential, typically of a vehicle. Typically, X corresponds to the longitudinal direction of the vehicle, Y the transverse direction, perpendicular to X, and Z the vertical direction to the surface formed by the X and Y axis.

The solution proposed by the invention is a connecting element made of an extruded hollow profile, attached to a first or upper bumper beam and to a second or lower bumper beam comprised in the crash management system of the invention in such a way that the extrusion direction is globally parallel to the vertical direction Z. The connecting element is attached to the first and second bumper beams in a solid manner so that in case of impact the connecting element may be stabilized in contact with another component of the vehicle like for example a wheel, or a longitudinal beam and may be deformed into a flat surface which will lead to a good deformation behaviour in the scope of a MPBD test.

The connecting element of the invention is an extruded hollow profile optionally having several hollow chambers. One advantage to have an extruded element with several hollow chambers is to develop the ability of the element to absorb the impact energy and to improve the moment of inertia of the system.

The extrusion direction parallel to the vertical direction Z permits to increase the flexibility of the geometry according to the bumper beam bending line without any additional machining operations. To achieve the same geometry with an extruded profile having an extrusion direction along the Y axis, it would be needed for example to bend the connecting element. Additionally, having an extruded connecting element, which extrusion direction is parallel to the vertical direction Z, allows to extend the bumper beam assembly in X and Y direction. Furthermore, the geometry of the connecting element is limited only by the extrusion ability of the element.

Due to its attachment between first and second bumper beams, the connecting element permits also to improve and to stabilize the crash managements system rigidity.

In some particular embodiments of the invention, the extruded connecting element may comprise one or more channels along the extrusion direction. One advantage to have an extruded element with one or more channel is to improve the robust attachment of the connecting element to the bumper beams. The connection by screwing into the extruded channel is a very cost effective and an even more robust solution. In addition, the length of the channel permits to have an attachment means longer as a simple hole.

According to the invention, the crash management system is a crash management system for a front part of a vehicle, oriented in a local referential, having a longitudinal direction X, a transverse direction Y perpendicular to the longitudinal direction X and a vertical direction Z perpendicular to the plane defined by said directions X and Y, comprising an assembly of bumper beams with at least a first bumper beam and a second bumper beam, oriented in said transverse direction Y, said first bumper beam and second bumper beam being vertically spaced wherein said first bumper beam is located above said second bumper beam, optionally comprising at least one crash box connected to at least a bumper beam, and comprising at least a connecting element characterized in that said connecting element connects said first bumper beam and said second bumper beam, and wherein said connecting element is an extruded hollow profile which extrusion direction is substantially parallel to said vertical direction Z.

The crash management system of the invention comprises an assembly of bumper beams which is oriented in the transverse direction Y. The terms "oriented" aims to define that the assembly of bumper beams direction extends in the transverse direction Y. In one embodiment, the assembly of bumper beams can be curved to meet the design of the car and is consequently in this case, not perfectly parallel to the transverse direction Y, but his main direction is globally orientated in the transverse direction Y i.e. extends in said transverse direction Y.

The crash management system of the invention comprises an assembly of bumper beams which comprises a first bumper beam and a second bumper beam being vertically spaced. The first bumper beam is located above the second bumper beam. The terms "vertically spaced" are aiming to define that the first and the second bumpers may not be directly in contact which each other but may be spaced a certain distance apart in the Z direction depending on the type of crash management system.

The first and the second bumper beam comprised in the bumper beams assembly of the crash management system of the invention may be spaced also in the longitudinal direction X so that an angle defined by the first and the second bumper beams may exist with the plane YZ. The terms "spaced in the longitudinal direction X" are aiming to define that the first and the second bumper beams may not be aligned with each other in the X direction. According to the invention the first and second bumper beams may be spaced in the longitudinal direction X so that an angle α defined by the first and second bumper beams and the plane YZ may be from −30° to +30°.

According to an embodiment of the invention the first bumper beam of the crash management system may be a profile or an open section having a front wall and having a flange extending the wall of the first bumper beam in the vertical direction Z downwardly in the direction of the second bumper beam. Preferably the first bumper beam is a hollow profile with a cavity, having a front wall and a rear wall connected by longitudinal walls and having a flange extending the front wall of the first bumper beam in the vertical direction Z downwardly in the direction of the second bumper beam. More preferably, the first bumper beam is an extruded hollow profile According to another embodiment of the invention the second bumper beam of the crash management system may be a profile or an open section having a front wall and having a flange extending the wall of the second bumper beam in said vertical direction Z upwardly in the direction of the first bumper beam. Preferably the second bumper beam is a hollow profile with a cavity, having a front wall and a rear wall connected by longitudinal walls and having a flange extending the front wall of the second bumper beam in the vertical direction Z upwardly in the direction of the first bumper beam. More preferably the second bumper beam is an extruded hollow profile.

In one embodiment of the invention the first bumper beam may have a flange extending in the vertical direction Z upwardly in the opposite direction of the second bumper beam.

The first and the second bumper beams may have one or more hollow chamber as required, depending of the level of energy to be absorbed.

According to the invention, the first and the second bumper beams of the crash management system may advantageously be connected to at least one crash box. Preferentially, the first bumper beam is connected to a first crash box and the second bumper beam is connected to a second crash box which is different.

According to the invention the crash management system comprises a connecting element which connects the first and second bumper beams of the bumper assembly. The connecting element of the invention is an extruded hollow profile which extrusion direction is substantially parallel to the vertical direction Z. The terms "substantially parallel to the vertical direction Z" are aiming to define that the extrusion direction may be in general parallel to the vertical direction. In one embodiment of the invention the angle defined by the first and second bumper beams and the plane YZ may be different of zero, the connecting element will be aligned with the first and second bumper beams and consequently in this case the extrusion direction may not be perfectly parallel to the vertical direction Z. When said first and second bumper beams are spaced in said longitudinal direction X so that an angle is defined by said first and second bumper beams and the plane YZ, the angle between the extrusion direction and the vertical direction is thus the same as the angle defined by said first and second bumper beams and the plane YZ.

The connecting element may be attached at any position of the first and second bumper beams in the transverse direction Y between the first and second bumper beam.

Advantageously the connecting element comprised in the crash management system extends the crash management system in the longitudinal direction X and/or in the transverse direction Y. In one embodiment, the connecting element extends the crash management system in the longitudinal direction X and in the transverse direction Y.

The connecting element of the invention is preferably an extruded hollow profile having at least two hollow chambers, each chamber having an outer wall, an inner wall and internal walls, the wall being parallels to the extrusion direction. The connecting element has preferably at least one integrated screwing channel parallel to the extruded direction of the connecting element which is used to attach said connecting element on the first and on the second bumper beams. The screwing channel is present on the height of the connecting element and permits to create a long and improved solid link between the bumper beams.

The connecting element may be drilled with holes, used to attach it to the first and/or to the second bumper beams with screws or bolts.

The crash management system of the invention comprises at least one connecting element connecting the first and the second bumper beams. In some embodiments, the connecting element may be attached to at least one crash box of the crash management system. Preferably, the crash management system of the invention comprises at least two connecting elements attached to each end of the first and second bumper beams permitting a stiffening of the end of said bumper beams assembly. In one particular embodiment of the invention, the crash management system comprises one connecting element attached to each end side of the bumper beams assembly and one or more connected element attached on other place of the first and second bumper beam.

Preferably, the connecting element attached at least to the flange of the first bumper beam. The flange of the first bumper beam is extending the front wall of the first bumper beam downwardly in the direction of the second bumper beam below.

Preferably, the connecting element is attached at least to the flange of the second bumper beam. The flange of the second bumper beam is extending the front wall of the second bumper beam upwardly in the direction of the first bumper beam above.

In one particular embodiment the connecting element of the invention has a flange permitting the attachment to the first bumper beam.

Preferably, the connecting element is attached by screws and/or bolts to each end of the first and second bumper beams. Holes may be done on the outer and inner walls of the connecting element to receive the attachments means.

In one embodiment of the invention, wherein the first bumper beam has no downwardly extended flange, the connecting element may be attached to the rear wall of the first bumper beam. In another embodiment of the invention, wherein the second bumper beam has no upwardly extended flange, the connecting element may be attached to the rear wall of the second bumper beam. Another embodiment may be to attach the connecting element directly to the rear walls of the first and second bumper beams.

According to the invention, in case of an impact the connecting element may cooperate with an additional part of the vehicle and may be deformed to prevent penetration of a foreign element into said vehicle. Preferably, the connecting element is placed on the end side of the bumper beams assembly of the crash management system of the invention. In this particular embodiment, the connecting element is attached to the first and second bumper beams only on one of its side. In case of impact the side of the connecting element of the invention which is not attached to the bumper beams assembly will come into contact with an additional part of the vehicle, for example a wheel. The connecting element and the additional part of the vehicle will cooperate, absorb the impact energy and prevent the penetration of a foreign element into the vehicle. Particularly, the cooperation of the connecting element with an additional part of the vehicle may create a flat surface able to absorb the impact energy and to avoid penetration of external material in the vehicle. In another embodiment the connecting element may be placed at the position of a crash box of the crash management system. In this particular embodiment, the connecting element will cooperate with the crash box and the longitudinal beam of the vehicle.

The connecting element of the invention may be made of materials such as plastic, steel or aluminium alloy. Preferably the connecting element is made of an aluminium alloy.

According to one embodiment, the connecting element of the invention is an extruded profile having at least two hollow chambers. Each chamber may be defined by an outer wall, an inner wall and an internal wall, the walls being parallels to the extrusion direction. In a particular embodiment at least one of the chamber may have the outer wall and the inner wall cut off. The cut may be done on the one wall or on several walls of one or several chambers of the connecting element to reduce the weight of the connecting element and therefore the weight of the crash management system of the invention.

According to the invention, the design of the extruded connecting element is adapted to the crash management system in which it is comprised. The walls of the connecting element of the invention may have different thicknesses. In the embodiment wherein the connecting element of the invention has one or several flanges, the walls and the flanges may have different thicknesses. The form of the connecting element may be adapted to the vehicle and to the performance to be achieved. Particularly, the form of the connecting element of the invention may be not flat and comprises at least one chamber with walls defining an angle. In another embodiment the wall of one chamber may be composed of two facets defining an angle; the angle extending the crash management system in the longitudinal direction X and transverse direction Y; preferably the angle is 5°.

The crash management system of the invention may be implemented in a vehicle, preferably on the front part of the vehicle.

LIST OF REFERENCES 1, 1', 1": crash management system
2, 2', 2": Assembly of bumper beams
3, 3', 3": first bumper beam
31, 31', 31": cavity of the first bumper beam
32, 32', 32": front wall of the first bumper beam
33, 33', 33": rear wall of the first bumper beam
34, 34', 34": longitudinal wall of the first bumper beam
35, 35', 35": longitudinal wall of the first bumper beam
36, 36', 36": flange of the first bumper beam
37, 37', 37": flange of the first bumper beam 3
38a, 38b, 38c, 38d: holes drilled in the flange 36 of the first bumper beam 3
38'a, 38'b, 38'c, 38'd: holes drilled in the flange 36 of the first bumper beam 3'
4, 4', 4": Second cross bumper beam
41, 41': cavity of the second bumper beam
42, 42', 42": front wall of the second bumper beam
43, 43': rear wall of the second bumper beam
44, 44': longitudinal wall of the second bumper beam
45, 45': longitudinal wall of the second bumper beam
46: flange of the second bumper beam 4'
47: flange of the second bumper beam 4'
48, 49: holes on the longitudinal wall 45 of the second bumper beam 4
50, 51: beams of the second bumper beam 4"
52: cavity of the beam 50
53: cavity of the beam 51
54: rear wall of the beam 50
5, 5': Crash box connected to the first bumper beam
6, 6': Crash box connected to the second bumper beam
100, 200, 300, 400, 500 Connecting element
101a, 101b: integrated screwing channel of the connecting element 100
102: flange of the connecting element 100
103a, 103b, 103c, 103d: hollow chambers of the connecting element 100
104, 105, 106, 107: outer walls of the hollow chambers of the connecting element 100
106a, 106b: facets of the outer wall 106
108, 109, 110, 111: inner walls of the hollow chambers of the connecting element 100
110a, 110b: facets of the outer wall 109
112, 113: internal wall of the connecting element 100
114: external wall of the connecting element 100
115: cut of the connecting element 100
116: hole on the flange 102 of the connecting element 100
117: hole in the hollow chamber 103a
201: outer wall of the connecting element 200
202: inner wall of the connecting element 200
203a: flange
204: hole on the flange 203a
205: hole on the inner wall 202
206: cut of the connecting element 200
302: flange of the connecting element 300
301a, 301b: integrated screwing channel of the connecting element 300
303a, 303b, 303c, 303d, 303e: hollow chambers of the connecting element 300
304, 305, 306, 307: outer walls of the hollow chambers of the connecting element 300
305a, 305b: facets of the outer wall 305
308, 309, 310, 311: inner walls of the hollow chambers of the connecting element 300
310a, 310b: facets of the outer wall 310
312, 313: internal walls of the connecting element 300
314: external wall of the connecting element 300
315, 316: holes in the flange 302
401: outer all of the connecting element 400
402: inner wall of the connecting element 400
403a, 403b: flange
404a, 404b: hole on the flange 403a and 403b respectively
405a, 405b, 405c: hole on the inner wall 202
406: wall in the connecting element 400
407: hollow chamber of the connecting element 400
503a, 503b, 503c, 503d, 503e, 503f: hollow chambers of the connecting element 500
504, 505, 506, 507, 508: outer walls of the hollow chambers of the connecting element 500
509, 510, 511, 512: inner walls of the hollow chambers of the connecting element 500
513, 514, 515, 516, 517: internal wall of the connecting element 500

518, 519: external wall of the connecting element 500
507a, 507b: facets of the outer wall 507
520, 521, 522, 523: hole on the connecting element 500
E: extrusion direction

DETAILED DESCRIPTION OF THE INVENTION

Throughout all the figures, same or corresponding elements may generally be indicated by same reference numerals. These depicted embodiments are to be understood as illustrative of the invention and not as limiting in any way.

Figure 1:
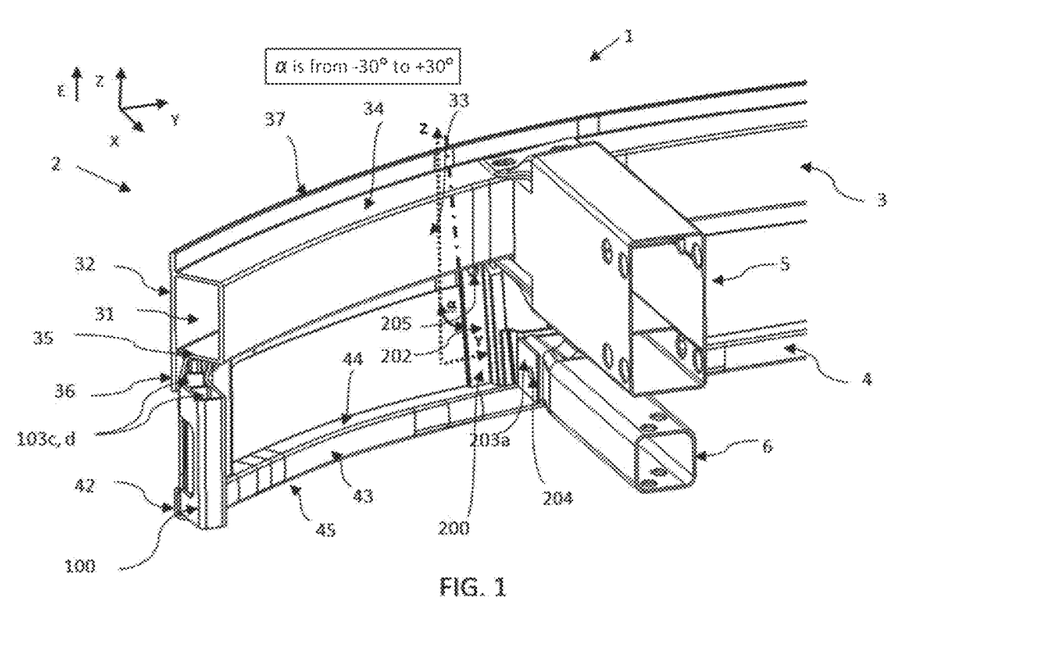
FIG. 1 is a rear view of part of one crash management system according to the invention

FIG. 1 represents a rear view of a part of a crash management system 1 according to one embodiment of the invention. The crash management system 1 is composed by an assembly of bumper beams 2, a crash box 5 and a crash box 6. The assembly of bumper beams comprises a first bumper beam 3 and a second bumper beam 4. The bumper beam 3 is above the bumper beam 4. The assembly of bumper beams 3 and 4 are slightly curved 4. Thus, the bumper beam 3 and 4 are globally positioned along a transverse axis Y perpendicular to longitudinal direction X and vertically spaced. A crash box 5 is attached on one end to the bumper beam 2 and on the other end to the longitudinal beam of the vehicle frame (not shown), using conventional attachments means. A second crash box 6 is attached on one end to connecting element 200 and on the other end to the longitudinal beam of the vehicle frame (not shown), using conventional attachments means.

The upper bumper beam 3 is designed to absorb impact energy during a collision impact. The lower bumper beam 4 is designed to protect pedestrians from lower leg impacts.

The first bumper beam 3 is a hollow profile having a cavity 31 and having a front wall 32 and a rear wall 33 connected by longitudinal walls 34 and 35. The bumper beam 3 has a flange 36 extending the front wall 32 in the vertical direction Z downwardly in the direction of the second s bumper beam 4. The flange 36 is used has an attachment means of components. The bumper beam 3 has also a flange 37 extending the front wall 32 in the vertical direction Z upwardly in the opposite direction than the flange 36.

The second cross bumper beam 4 is a hollow profile having a cavity 41 and having a front wall 42 and a rear wall 43 connected by longitudinal walls 44 and 45.

A first connecting element 100 is placed on the end side of the crash management system 1 of the invention in the space in-between the longitudinal wall 35 of the bumper beam 3 and the longitudinal wall 44 of the bumper beam 4. FIG. 1 represents only one end of the crash management system, the second end being the same with the possibility to have a towing eye fixation system.

A second connecting element 200 is placed in the space in-between the longitudinal wall 35 of the bumper beam 3 and the longitudinal wall 44 of the bumper beam 4. The connecting element 200 has flange 203a, a second flange symmetrically positioned on the other side of the connecting element 200 is presents but is not visible in the FIG. 1. The flange 203a has a hole 204 used to attach the crash box 6 to the crash management system 1. The connecting element 200 has an outer wall 201 (visible on FIG. 2) and an inner wall 202. A hole 205 is drilled on the inner wall of the connecting element 200 to receive the screw or bolt for attaching the connecting element 200 to the flange 36 of the first bumper beam 3.

On the end side of the assembly of bumper beams 2, the first bumper beam 3 and the second bumper beam 4 are aligned one above the other and in relation to each other in the longitudinal direction and in the vertical direction. The angle defined by the first and second bumper beams 3 and 4 and the plane YZ is 0°.

In the region of the connecting element 200, the first bumper beam 3 and the second bumper beam 4 are not aligned one above the other. The angle defined by the first and second bumper beams 3 and 4 and the plane YZ is bigger than 0°, extending the dimensions of the crash management system in the longitudinal direction X.

Figure 2:
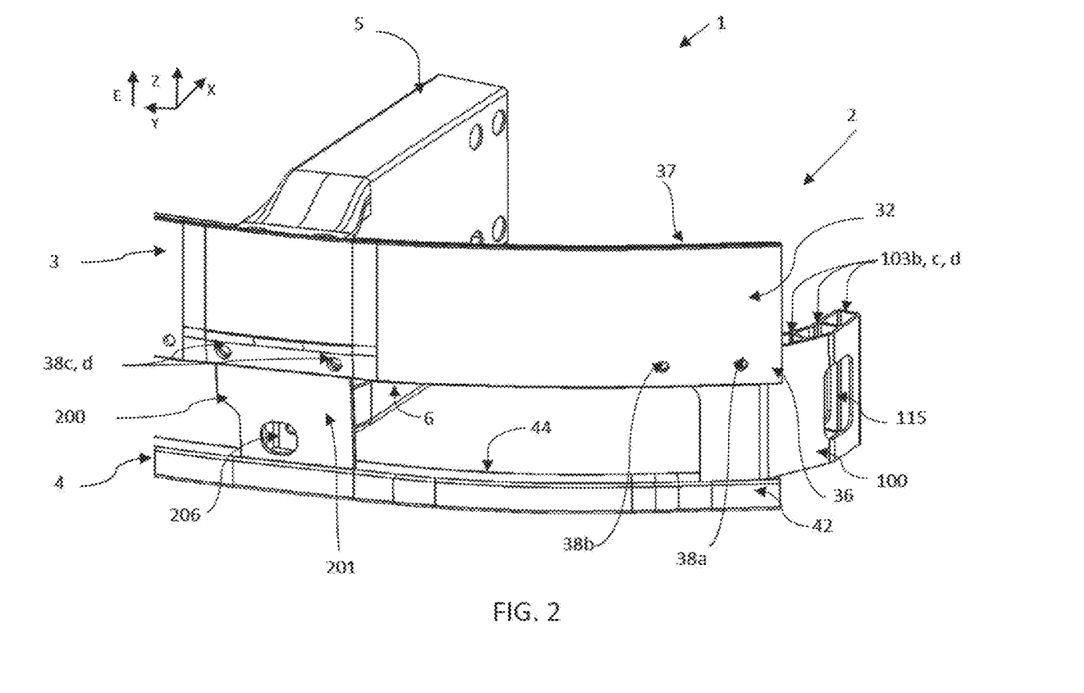
FIG. 2 is a front view of part of the crash management system of FIG. 1

FIG. 2 represents a front view of the FIG. 1. A connecting element 100 is placed on the end side of the crash management system 1 of the invention in the space in-between the first and second bumper beams. A second connecting element 200 is placed at the position of the crash boxes 5 and 6, in the space in-between the longitudinal wall 35 of the bumper beam 3 and the longitudinal wall 44 of the bumper beam 4. Holes 38a, 38b, 38c and 38d are drilled in the flange 36 to receive the screws or bolts for attaching the connecting element 100 and the connecting element 200 to the flange 36 of the first bumper beam 3. A crash box 5 is attached to the first bumper beam 3.

The connecting element 100 has several hollow chambers 103a, 103b, 103c, 103d. Only the chambers 103b, 103c, 103d are visible on FIG. 2. The hollow chambers 103c and 103d are cut off on their outer walls 106 and 107.

The connecting element 200 has an outer wall 201. The outer wall 201 has a perforation 206.

Figure 3:
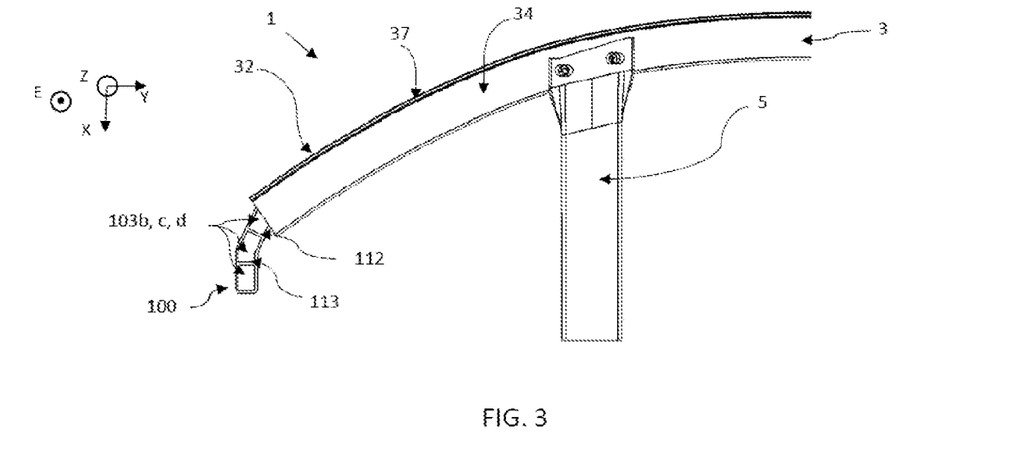
FIG. 3 is a top view of FIG. 1

FIG. 3 represents a view from the top of FIG. 1. The bumper beam 3 is curved mainly towards the end but its main direction is globally orientated in the transverse direction Y, and therefore globally parallel to the transverse direction Y. The crash box 5 is attached to the bumper beam 3. The connecting element 100 is attached to the bumper beams assembly is an extruded profile, which extrusion direction E is parallel to the vertical direction Z. The connecting element 100 of the FIG. 3 has several hollow chambers 103a, 103b, 103c, 103d (103a is not visible in FIG. 3). The hollow chambers have not all the same form. The connecting element 100 extends the dimensions of the crash management system in the longitudinal direction X and in the transverse direction Y.

Figure 4:
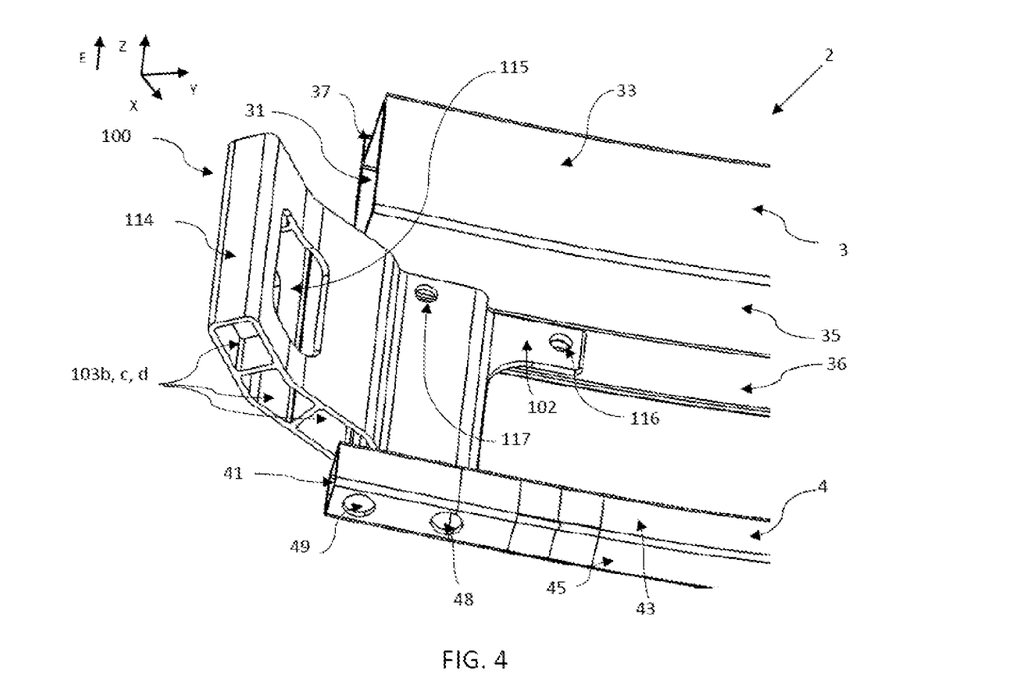
FIG. 4 is a representation of one end of the of FIG. 1

FIG. 4 represents one end of the FIG. 1. The connecting element 100 is an extruded hollow profile with hollow chambers 103a, 103b, 103c, 103d (103a is not visible in FIG. 4). The connecting element 100 has a flange 102 used to attach the connecting element 100 to the flange 36 of the bumper beam 3. The flange 102 and the hollow chamber 103a are perforated with holes 116 and 117 (respectively) permitting to fix the connecting element 100 to the bumper beam 3.

The bumper beam 4 is drilled with holes 48 and 49 permitting to attach the connecting element 100 by the integrated screwing channels 101a and 101b to the first and second bumper beams 3 and 4.

Figure 5:
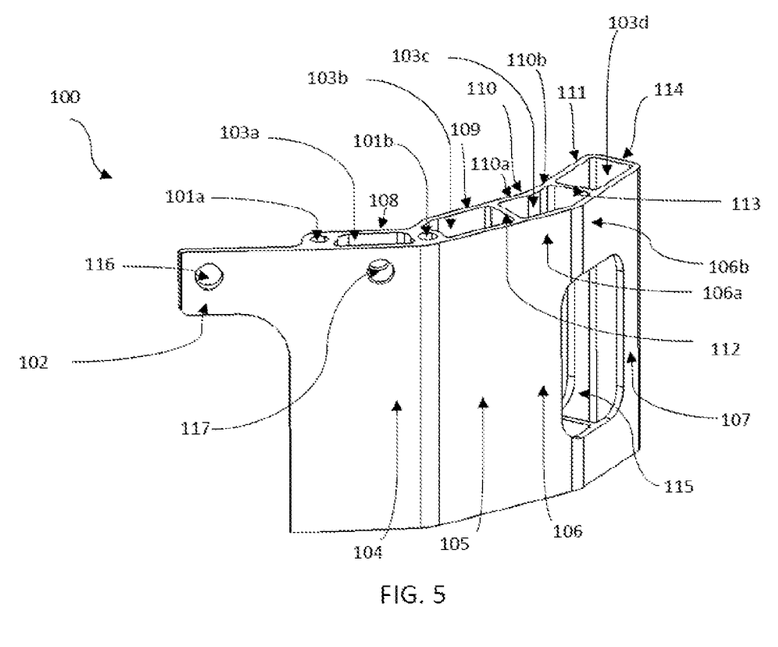
FIG. 5 is a representation of one connecting element of FIG. 1

FIG. 5 represents the connecting element 100. This connecting element is an extruded hollow profile with 4 hollow chambers 103a, 103b, 103c, 103d. The chamber 103a has an outer wall 104 and an inner wall 108 that are parallel to the extrusion direction E of the connecting element 100. The hollow chamber 103a is drilled with a hole 117 which is used to attach the connecting element 100 to the bumper beam 3. Two integrated screwing channels 101a and 101b are placed on each side of the hollow chamber 103a and are parallel to the extrusion direction E. These screwing channels 101a and 101b are used to attach the connecting element 100 to the two bumper beams 3 and 4 and create therefore a solidest link between the two bumper beams 3 and 4 and the connecting element 100. The outer wall 104 is extended by a flange 102 which is perforated by a hole 116. The flange 102 and the hole 116 permit to attach the connecting element 100 to the flange 36 of the bumper beam 3. The chamber 103*b* has an outer wall 105 and an inner wall 109 that are parallel to the extrusion direction E of the connecting element 100. The chamber 103*c* has an outer wall 106 and an inner wall 110 that are parallel to the extrusion direction E of the connecting element 100. The chamber 103*d* has an outer wall 107, an inner wall 111 and an external wall 114 that are parallel to the extrusion direction E of the connecting element 100. The chambers 103*b* and 103*c* have a common internal wall 112. The chambers 103*c* and 103*d* have a common internal wall 113. The internal walls 112 and 113 are parallel to the extrusion direction E of the connecting element 100.

The outer walls 106 and 107, and the inner wall 110 and 111 are cut off permitting a cut 115 of the chambers 103*c* and 103*d*.

The connecting element 100 is not flat. The outer wall 106 and the inner wall 110 are each composed of two facets 106*a*, 106*a*, 110*a* and 110*b*. The facets 106*a* and 106*b* form an angle.

Figure 6:
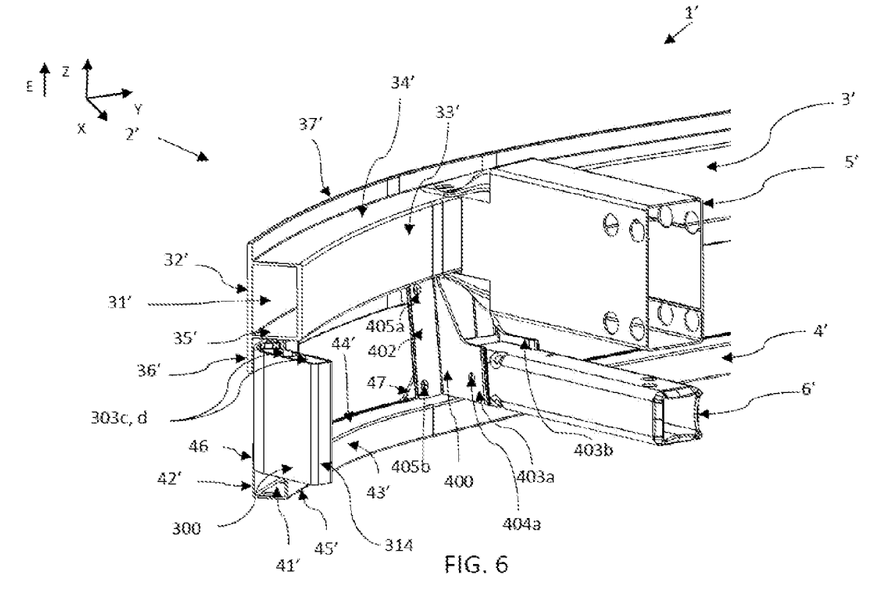
FIG. 6 is a rear view of part of one crash management system according to the invention

FIG. 6 represents a rear view of another embodiment of the invention. The crash management system 1' is composed by an assembly of bumper beams 2', a crash box 5' and a crash box 6'. The assembly of bumper beams comprises a first bumper beam 3' and a second bumper beam 4'. The bumper beam 3' is above the bumper beam 4'. The first bumper beam 3' is a hollow profile having a cavity 31' and having a front wall 32' and a rear wall 33' connected by longitudinal walls 34' and 35'. The bumper beam 3' has a flange 36' extending the front wall 32' in the vertical direction Z downwardly in the direction of the second bumper beam 4'. The flange 36' is used as an attachment means of components. The bumper beam 3' has also a flange 37' extending the front wall 32' in the direction Z upwardly in the opposite direction than the flange 36'.

The second cross bumper beam 4' is a hollow profile having a cavity 41' and having a front wall 42' and a rear wall 43' connected by longitudinal walls 44' and 45'. The bumper beam 4' has two flanges 46 and 47 extending the front wall 42' in the vertical direction Z upwardly in the direction of the first cross bumper beam 3'. The flanges 46 and 47 are used as attachment means of components A connecting element 300 is placed on the end side of the crash management system 1' in the space in-between the first and second bumper beams 3' and 4'. The connecting element 300 has several hollow chambers 303*a*, 303*b*, 303*c*, 303*d*, 303*e*. Only the chambers 303*c*, 303*d* are visible on FIG. 6. The chamber 303*d* of the connecting element 300 has an external wall 314, parallel to the extrusion direction E.

A second connecting element 400 is placed on the level of the crash boxes 5' and 6', in the space in-between the longitudinal wall 35' of the bumper beam 3' and the longitudinal wall 44' of the bumper beam 4'. The connecting element 400 has flanges 403*a* and 403*b*. The flange 403*a* has a hole 404*a* used to attach the crash box 6' to the crash management system 1'. A second hole may be positioned on the flange 403*b*, but is not visible on the FIG. 6. The connecting element 400 has an inner wall 402, perforated with holes 405*a* and 405*b*.

Figure 7:
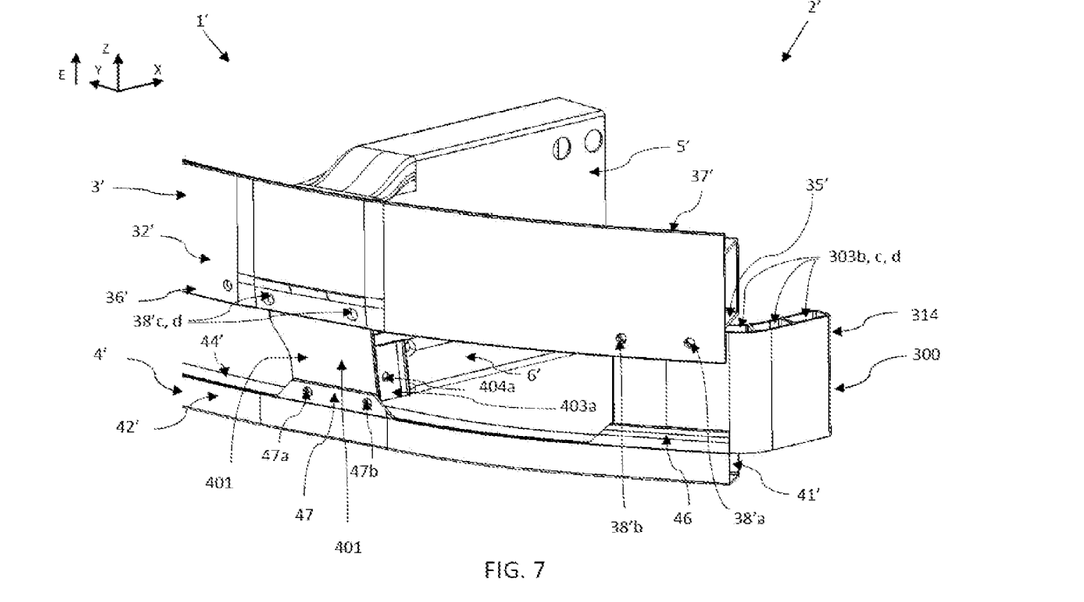
FIG. 7 is a front view of part of the crash management system of FIG. 6

FIG. 7 represents a front view of FIG. 6. A first connecting element 300 is placed on the end side of the crash management system 1' in the space in-between the first and second bumper beams 3' and 4'. A second connecting element 400 is placed on the level of the crash boxes 5' and 6', in the space in-between the longitudinal wall 35' of the bumper beam 3' and the longitudinal wall 44' of the bumper beam 4'. The bumper beam 3' has a flange 36' extending the front wall 32' in the vertical direction Z downwardly in the direction of the second cross bumper beam 4'. The flange 36' is used has an attachment means of components. The bumper beam 3' has also a flange 37' extending the front wall 32' in the vertical direction Z upwardly in the opposite direction than the flange 36'. The bumper beam 4' has two flanges 46 and 47 extending the front wall 42' in the vertical direction Z upwardly in the direction of the first cross bumper beam 3'. The flanges 46 and 47 are used as attachment means of components.

Holes 38'*a*, 38'*b*, 38'*c* and 38'*d* are drilled in the flange 36' to receive the screws or bolts for attaching the connecting element 300 and the connecting element 400 to the flange 36' of the first bumper beam 3'. Holes 47*a* and 47*b* are drilled in the flange 47 to receive the screws or bolts for attaching the connecting element 400 to the flange 47 of the first bumper beam 4'.

The connecting element 300 has several hollow chambers 303*a*, 303*b*, 303*c*, 303*d*, 303*e*. Only the chambers 303*b*, 303*c*, 303*d* are visible on FIG. 7. The chamber 303*d* has an external wall 314 parallel to the extrusion direction E.

The connecting element 400 has a hollow chamber 407. The connecting element 400 has an outer wall 401 and a flange 403*a*. The flange 403*a* has a hole 404*a* used to attach the crash box 6' to the crash management system 1'.

Figure 8:
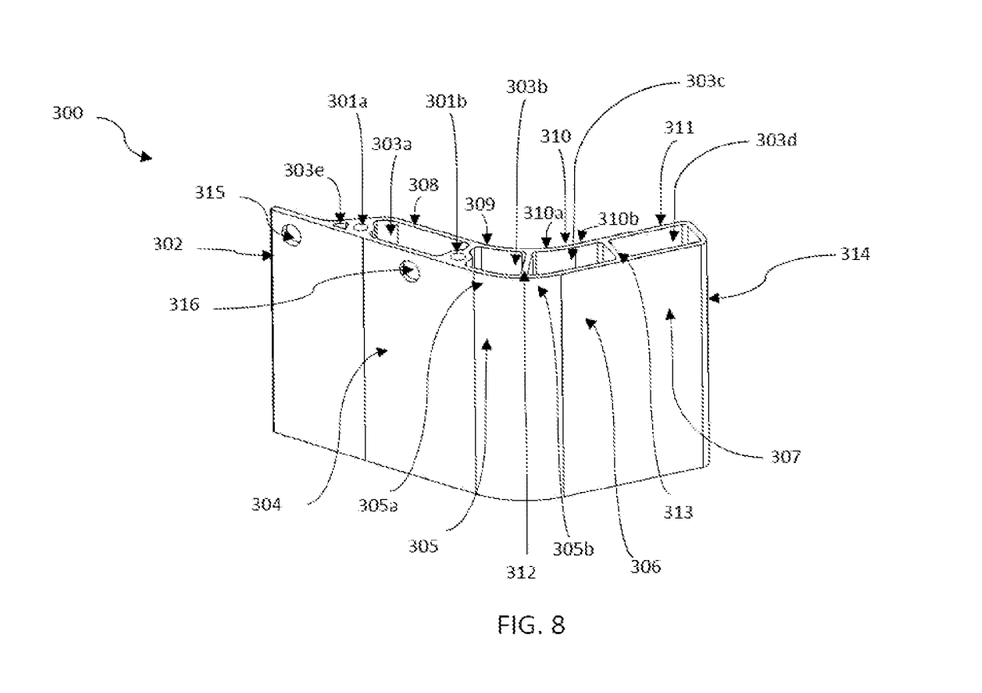
FIG. 8 is a representation of one connecting element of FIG. 6

FIG. 8 represents the connecting element 300. The connecting element 300 has several hollow chambers 303*a*, 303*b*, 303*c*, 303*d* and 303*e*. The chamber 303*a* has an outer wall 304 and an inner wall 308 that are parallel to the extrusion direction E of the connecting element 300. The hollow chamber 303*a* is drilled with a hole 316 which is used to attach the connecting element 300 to the bumper beam 3'. Two integrated screwing channels 301*a* and 301*b* are placed on each side of the hollow chamber 303*a* and are parallel to the extrusion direction E. These screwing channels 301*a* and 301*b* are used to attach the connecting element 300 to the two bumper beams 3' and 4' and create therefore a solidest link between the two bumper beams 3' and 4' and the connecting element 300. The outer wall 304 is extended by a flange 302 which is perforated by a hole 315. The flange 302 and the hole 315 permit to attach the connecting element 300 to the flange 36' of the bumper beam 3'. The chamber 303*b* has an outer wall 305 and an inner wall 309 that are parallel to the extrusion direction E of the connecting element 300. The chamber 303*c* has an outer wall 306 and an inner wall 310 that are parallel to the extrusion direction E of the connecting element 300. The chamber 303*d* has an outer wall 307, an inner wall 311 and an external wall 314 that are parallel to the extrusion direction E of the connecting element 300. The chambers 303*b* and 303*c* have a common internal wall 312. The chambers 303*c* and 303*d* have a common internal wall 313. The internal walls 312 and 313 are parallel to the extrusion direction E of the connecting element 300.

The connecting element 300 is not flat. The outer wall 305 and the inner wall 309 are each composed of two facets 305*a*, 305*a*, 310*a* and 310*b*. The facets 305*a* and 305*b* form an angle.

Figure 9:
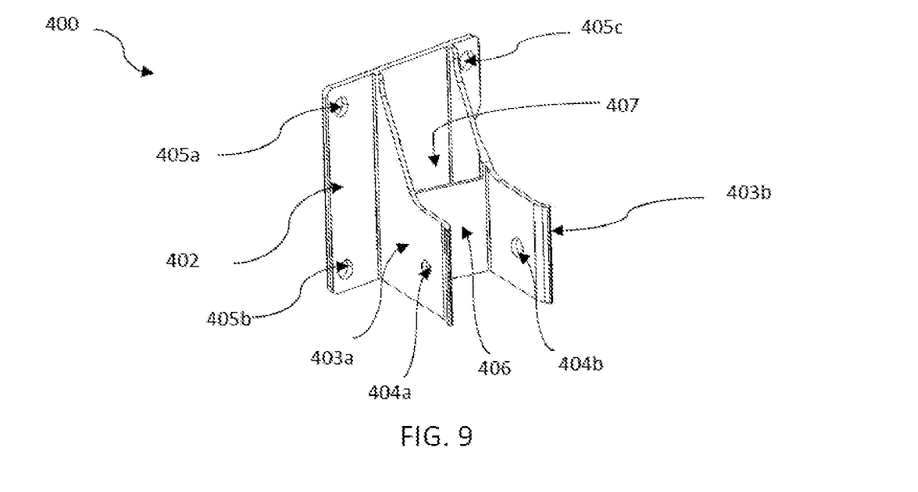
FIG. 9 is a representation of another connecting element of FIG. 6

FIG. 9 represents the connecting element 400. The connecting element has an inner wall 402 which is perforated with holes 405*a*, 405*b* and 405*c* used to attach the connecting element 400 to the first and the second bumper beams 3' and 4'. The connecting element 400 has two flanges 403*a* and 403b perpendicular to the inner wall 402 and linked by a wall 406 creating a hollow chamber 407. The flanges 403a and 403b are perforated by holes 404a and 404b respectively used to attach the connecting element 400 to the crash box 6'.

Figure 10:
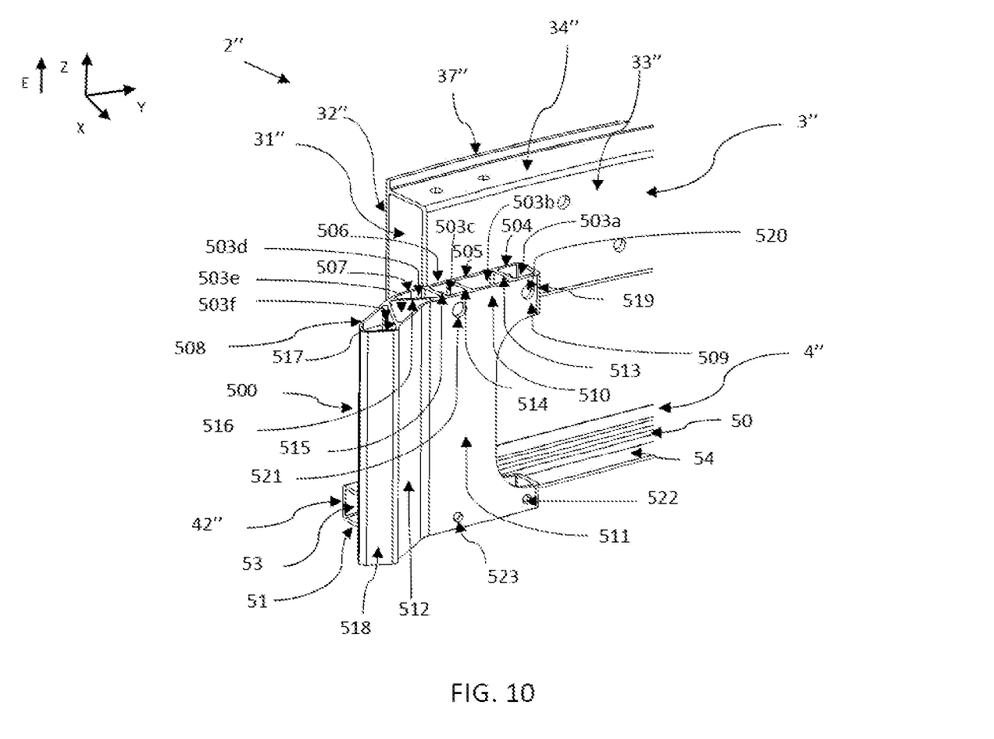
FIG. 10 is a rear view is a representation of one end of one of one crash management system according to the invention

FIG. 10 represents a rear view of another embodiment of the invention. A connecting element 500 is placed on the end side of the crash management system 1". The first bumper beam 3" is a hollow profile having a cavity 31" and having a front wall 32" and a rear wall 33" connected by longitudinal walls 34" and 35". The bumper beam 3" has a flange 37" extending the front wall 32" in the direction Z upwardly. The bumper beam 4" is made of 2 hollow profiles 50 and 51 and has therefore two cavities 52 and 53. The cavity 52 has a rear wall 54. The connecting element 500 is attached by screws on the rear wall 33" of the first bumper beam 3" and on the rear wall 54 of the second bumper beam 4".

The connecting element 500 has several hollow chambers 503a, 503b, 503c, 503d, 503e, 503f. The chambers 503a, 503b, 503c have a rectangular cross-section. The chamber 503a has an outer wall 504, an inner wall 509, an external wall 519. The chamber 503b has an outer wall 505 and an inner wall 510 that are parallel to the extrusion direction E of the connecting element 500. The chambers 503a and 503b have a common internal wall 513. The chambers 503a and 503b are partially cut off. The chamber 503c has an outer wall 506, and an inner wall 511 that are parallel to the extrusion direction E of the connecting element 500. The chambers 503b and 503c have a common internal wall 514. The chamber 503d has an outer wall 507 that is parallel to the extrusion direction E of the connecting element 500. The chambers 503c and 503d have a common internal wall 515. The chamber 503e has an inner wall 512 that is parallel to the extrusion direction E of the connecting element 500. The chambers 503d and 503e have a common internal wall 516. The chamber 503f has an outer wall 508 and an external wall 518 that are parallel to the extrusion direction E of the connecting element 500. The chambers 503e and 503f have a common internal wall 517. All the internal walls 513, 514, 515, 516 are parallel to the extrusion direction E of the connecting element 500.

The connecting element 500 is not flat. The outer wall 507 and the inner wall 512 are each composed of two facets 507a, 507b, 512a, 512b. The facets 507a and 507b form an angle. The facets 512a and 512b form an angle also.

The connecting element 500 has several holes 520, 521, 522, 523 passing through it The holes 520, and 521 are used to attach the connecting element 500 to rear wall 33" of the first bumper beam 3". The holes 523 and 522 are used to the connecting element 500 to the rear wall 50 of the second cavity 52 of the second bumper beam 4".

Figure 11:
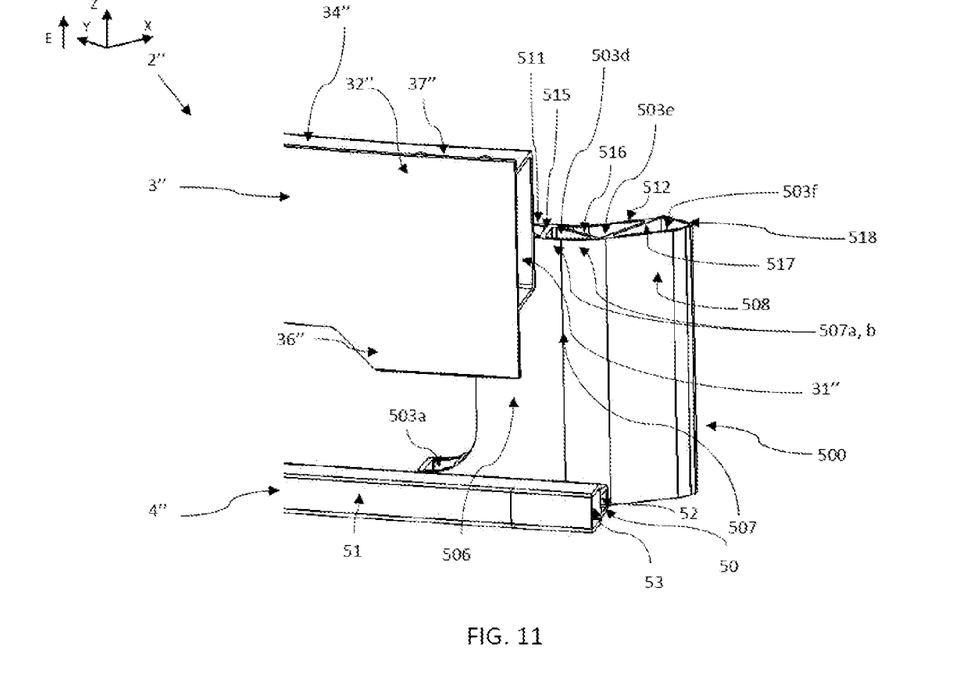
FIG. 11 is representing the front view of the FIG. 8

FIG. 11 represents a front view of crash management system of FIG. 8 where the connecting element 500 is placed on the end side of the crash management system 1" in the space in-between the first and second bumper beams 3" and 4". The bumper beam 3" and 4" have not the same length in the Y direction. The bumper beam 3" has a flange 36" extending the front wall 32" in the vertical direction Z downwardly in the direction of the second cross bumper beam 4". The flange 36" is used has an attachment means of components. The bumper beam 3" has a flange 37" extending the front wall 32" in the vertical direction Z upwardly. The bumper beam 4" has two cavities 52 and 53. The connecting element 500 is attached to the rear wall 3" of the first bumper beam 3" and to the rear wall 50 of the second cavity 52 of the second bumper beam 4".

The connecting element 500 is not flat. The outer wall 507 is composed of two facets 507a, 507b, which form an angle.

The FIGS. 1, 2, 3, 4, 6, 7, 10 and 11 represent only one side of the crash management system 1, 1' and 1". The other side may be essentially symmetrically the same except that it may have the possibility to have a towing eye.

The invention claimed is:

1. A crash management system for a front part of a vehicle, said system being oriented in a longitudinal direction X, a transverse direction Y perpendicular to the longitudinal direction X, and a vertical direction Z perpendicular to the plane defined by said directions X and Y, the system comprising:
an assembly of bumper beams comprising a first bumper beam oriented in the transverse direction Y, and spaced vertically above a second bumper beam oriented in the transverse direction Y; and
a connecting element connected to the first bumper beam and the second bumper beam;
wherein the connecting element is an extruded hollow profile having an extrusion direction E that is substantially parallel to the vertical direction Z; and
wherein said connecting element comprises an integrated channel oriented parallel to said extrusion direction of said connecting element, and wherein said channel is used to attach said connecting element to said first bumper beam and to said second bumper beam.

2. The system according to claim 1, wherein said connecting element extends said crash management system in at least one of said longitudinal direction X and said transverse direction Y.

3. The system according to claim 1, wherein said first bumper beam and said second bumper beam are spaced in said longitudinal direction X, so that an angle α defined by said first bumper beam and said second bumper beam and the plane YZ is from −30° to +30°.

4. The system according to claim 1, wherein said connecting element cooperates with an additional part of the vehicle and is deformable upon impact with a foreign element, to prevent penetration of the foreign element into the vehicle.

5. The system according to claim 1, wherein said first bumper beam is a hollow profile having a front wall, wherein said first bumper beam comprises a flange extending said front wall of said first bumper beam in said vertical direction Z downwardly in the direction of said second bumper beam, and/or wherein the said second bumper beam is a hollow profile having a front wall, wherein said second bumper beam has a flange extending said front wall of said second bumper beam in said vertical direction Z upwardly in the direction of said first bumper beam.

6. The system according to claim 5, wherein said connecting element is attached at least to said flange of said first bumper beam, and/or wherein said connecting element is attached at least to said flange of said second bumper beam).

7. The system according to claim 1, wherein said connecting element is attached by screws and/or bolts to each end of said first and second bumper beams.

8. The system according to claim 1, wherein the connecting element comprises a flange, permitting the attachment of said connecting element to said first bumper beam.

9. The system according to claim 1 comprising:
a first connecting element connected to a first end of said bumper beams assembly, to a first end of the first bumper beam, and to a first end of the second bumper beam, and a second connecting element connected to a second end of said bumper beams assembly, to a second end of the first bumper beam, and to a second end of the second bumper beam, permitting a stiffening of said first ends and said second end of said bumper beams assembly.

10. The system according to claim 1, wherein said connecting element is made of plastic, steel, or an aluminium alloy.

11. The system according to claim 1, wherein said connecting element is an extruded hollow profile having at least two hollow chambers wherein each one of said at least two hollow chambers comprises an outer wall, an inner wall, and an internal wall, and wherein said outer wall, said inner wall, and said internal wall extend parallel to said extrusion direction.

12. The system according to claim 11, wherein at least one of said outer wall and said inner wall of said connecting element includes a cut out.

13. The system according to claim 11, wherein said connecting element is not flat and/or comprises at least one chamber having said outer wall and said inner wall, wherein said outer wall and said inner wall comprises two facets, and wherein said two facets form an angle.

14. A vehicle comprising the crash management system according to claim 1.

15. The system according to claim 1, further comprising a crash box connected to at least one of the first bumper beam and the second bumper beam.

16. The system according to claim 1, wherein the connecting element is directly connected to the first bumper beam and the second bumper beam.

* * * * *